(12) United States Patent
Liu et al.

(10) Patent No.: US 11,184,807 B2
(45) Date of Patent: Nov. 23, 2021

(54) METHOD FOR ENABLING NETWORK TO FALL BACK, TERMINAL DEVICE, AND ACCESS NETWORK DEVICE

(71) Applicant: GUANGDONG OPPO MOBILE TELECOMMUNICATIONS CORP., LTD., Guangdong (CN)

(72) Inventors: Jianhua Liu, Guangdong (CN); Ning Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 8 days.

(21) Appl. No.: 16/627,228

(22) PCT Filed: Aug. 25, 2017

(86) PCT No.: PCT/CN2017/099047
§ 371 (c)(1),
(2) Date: Dec. 27, 2019

(87) PCT Pub. No.: WO2019/037083
PCT Pub. Date: Feb. 28, 2019

(65) Prior Publication Data
US 2020/0229045 A1    Jul. 16, 2020

(51) Int. Cl.
*H04W 36/00*    (2009.01)
*H04W 76/27*    (2018.01)
(Continued)

(52) U.S. Cl.
CPC ......... *H04W 36/0022* (2013.01); *H04W 4/02* (2013.01); *H04W 48/16* (2013.01);
(Continued)

(58) Field of Classification Search
CPC ... H04W 36/0022; H04W 76/27; H04W 4/02; H04W 48/16; H04W 48/18; H04W 74/08;
(Continued)

(56) References Cited

U.S. PATENT DOCUMENTS

2009/0075657 A1    3/2009  Klatt
2009/0238143 A1    9/2009  Mukherjee
(Continued)

FOREIGN PATENT DOCUMENTS

CN    101287285 A    10/2008
CN    101400143 A    4/2009

OTHER PUBLICATIONS

International Search Report in the international application No. PCT/CN2017/099047, dated Apr. 27, 2018.
(Continued)

*Primary Examiner* — Diane D Mizrahi

(57) ABSTRACT

Disclosed in the present application are a method for enabling a network to fall back, a terminal device and an access network device. The method comprises: a terminal device receives indication information sent by an access network, the indication information being used for indicating whether a first network supports a specific service to be executed by the terminal device; and if the indication information indicates that the first network does not support the specific service, the terminal device initiates the specific service in a second network. When the terminal device cannot initiate a specific service in a current network, the specific service can be initiated in another network based on an instruction of an access network, so that a complex signaling interaction between the terminal device and a core network is avoided, and a delay of a network fallback process is reduced.

19 Claims, 4 Drawing Sheets

(51) Int. Cl.
H04W 4/02 (2018.01)
H04W 48/16 (2009.01)
H04W 48/18 (2009.01)
H04W 74/08 (2009.01)
H04W 84/04 (2009.01)

(52) U.S. Cl.
CPC ........... *H04W 48/18* (2013.01); *H04W 74/08* (2013.01); *H04W 76/27* (2018.02); *H04W 84/042* (2013.01)

(58) Field of Classification Search
CPC ........... H04W 84/042; H04W 36/0033; H04W 36/08; H04W 36/14; H04W 4/24
See application file for complete search history.

(56) References Cited

U.S. PATENT DOCUMENTS

| | | |
|---|---|---|
| 2012/0120789 A1 | 5/2012 | Shyamal |
| 2014/0192772 A1 | 7/2014 | Somasundaram et al. |
| 2016/0007239 A1 | 1/2016 | Manepalli et al. |
| 2019/0268827 A1* | 8/2019 | Kim ..................... H04W 48/02 |

OTHER PUBLICATIONS

3GPP TS 23.272 V14.0.0 (Mar. 2017), 3rd Generation Partnership Project; Technical Specification Group Services and System Aspects; Circuit Switched (CS) fallback in Evolved Packet System (EPS) Stage 2 (Release 14).
3GPP TS 23.501 V0.4.0 (Apr. 2017), 3rd Generation Partnership Project; Technical Specification Group Services and System Aspects; System Architecture for the 5G System Stage 2 (Release 15).
English translation of the Written Opinion of the International Search Authority in the international application No. PCT/CN2017/099047, dated Apr. 27, 2018.
NTT DOCOMO: "SA WG2 Meeting #117; S2-165848; Multimedia calls fallback from NextGen system to EPS" 3GPP Draft; S2-165848 Fallback TO_EPS_V2_1, 3rd Generation Partnership Project (3GPP), vol. SA WG2, No. Kaohsiung city, Taiwan; Oct. 17-Oct. 21, 2016, Oct. 16, 2016 (Oct. 16, 2016), XP051155429, [ retrieved on Oct. 16, 2016]* p. 4, lines 1-5 ** the whole document *.
NEC: "3GPP TSG RAN WG2 RRC Adhoc; R2-083007; Fast Cs service redirection for LTE" 3GPP Draft; R2-083007 Fast CS Service Redirection for LTE, 3rd Generation Partnership Project (3GPP), vol. RAN WG2, No. Sophia Antipolis, France; Jun. 2, 2008, Jun. 2, 2008 (Jun. 2, 2008) XP050142188, [ retrieved on Jun. 2, 2008]* the whole document ** figure 1 figure 2 *.
Supplementary European Search Report in the European application No. 17922124.7, dated Jun. 30, 2020.
First Office Action of the Chilean application No. 201903900, dated Feb. 18, 2021.
First Office Action of the European application No. 17922124.7, dated Feb. 18, 2021.
Second Office Action of the European application No. 17922124.7, dated Jun. 8, 2021.

* cited by examiner

METHOD FOR ENABLING NETWORK TO FALL BACK, TERMINAL DEVICE, AND ACCESS NETWORK DEVICE

TECHNICAL FIELD

Embodiments of the disclosure relate to the field of wireless communication, and more particularly, to a network fallback method, a terminal device and an access network device.

BACKGROUND

In a Long Term Evolution (LTE) system, a Circuit Switch FallBack (CSFB) technology is a temporary solution to provide voice service for a multi-mode single standby terminal device in a Time Division LTE (TD-LTE) system. A data service and short message service of the terminal device is born in an LTE network. A telephone service falls back to a Circuit Switch (CS) network, the data service may be interrupted in a fallback process, and after the telephone service is ended, the terminal device returns to the LTE network.

In an existing CSFB process, a terminal device is required to perform complex signaling interactions with a core network, which results in excessive time for network fallback and prolongs a delay in network fallback.

SUMMARY

The embodiments of the disclosure provide a network fallback method, a terminal device and an access network device, which may reduce a delay of a network fallback process.

A first aspect provides a network fallback method, which may include the following operations. A terminal device receives indication information sent by an access network, the indication information being used for indicating whether a first network supports a specific service to be executed by the terminal device; and when the indication information indicates that the first network does not support the specific service, the terminal device initiates the specific service in a second network.

Therefore, when the terminal device cannot initiate a specific service in a present network, the specific service can be initiated in another network based on an indication from the access network, and thus complex signaling interactions between the terminal device and a core network are avoided, and a delay in network fallback process is reduced.

In a possible implementation, the first network may include the access network, a core network to which the access network belongs, a Public Land Mobile Network (PLMN) to which the access network belongs or a sliced network carrying the specific service.

In a possible implementation, the specific service may include a voice service or a video service.

In a possible implementation, before the operation that the terminal device receives the indication information sent through the access network, the method may further include that the terminal device sends a service request message to the access network. The service request message is used for requesting for execution of the specific service in the first network.

The operation that the terminal device receives the indication information sent through the access network may include that the terminal device receives the indication information sent through the access network according to the service request message.

In a possible implementation, the operation that the terminal device sends the service request message to the access network may include the following actions. The terminal device sends a Radio Resource Control (RRC) connection establishment request message to the access network, the RRC connection establishment request message carrying the service request message; or the terminal device sends an RRC connection establishment complete message to the access network, the RRC connection establishment complete message carrying the service request message.

In a possible implementation, the service request message may carry a network identifier of the first network.

In a possible implementation, the operation that the terminal device receives the indication information sent through the access network may include the following action. The terminal device receives system information sent through the access network, the system information carrying the indication information.

In a possible implementation, when the indication information indicates that the first network does not support the specific service, the indication information may further be configured to indicate the second network.

The operation that the terminal device initiates the specific service in the second network may include that the terminal device initiates the specific service in the second network indicated by the indication information.

In a possible implementation, the operation that the terminal device initiates the specific service in the second network may include that the terminal device determines the second network in multiple networks and initiates the specific service in the second network.

In a possible implementation, when the indication information indicates that the first network does not support the specific service, before the operation that the terminal device initiates the specific service in the second network, the method may further include the following operations. The terminal device receives an RRC connection release message sent through the access network; and the terminal device releases an RRC connection with the first network according to the RRC connection release message.

A second aspect provides a network fallback method, which may include the following operations. An access network device determines whether a first network supports a specific service to be executed by a terminal device; and the access network device sends indication information to the terminal device, the indication information being used for indicating whether the first network supports the specific service, to enable the terminal device to initiate the specific service in a second network when the first network does not support the specific service.

Therefore, when the terminal device cannot initiate a specific service in a present network, the access network device instructs the terminal device to initiate the specific service in another network to enable the terminal device to initiate the specific service in the other network based on an indication of an access network. In this way, complex signaling interactions between the terminal device and a core network are avoided, and a delay in a network fallback process is reduced.

In a possible implementation, the first network may include an access network where the access network device is located, a core network to which the access network belongs, a PLMN to which the access network belongs or a sliced network carrying the specific service.

In a possible implementation, the specific service may include a voice service or a video service.

In a possible implementation, the operation that the access network device determines whether the first network supports the specific service to be executed by the terminal device may include the following actions. The access network device receives information indicating whether the first network supports the specific service from the core network; or the access network device sends a query message to the core network and receives the information sent by the core network according to the query message and indicating whether the first network supports the specific service; or the access network device determines whether the first network supports the specific service according to pre-configured information indicating whether the first network supports the specific service.

In a possible implementation, before the operation that the access network device determines whether the first network supports the specific service to be executed by the terminal device, the method may further include the following operation. The access network device receives a service request message sent by the terminal device, the service request message being used to request for execution of the specific service in the first network.

The operation that the access network device sends the indication information to the terminal device may include that the access network device sends the indication information to the terminal device according to the service request message.

In a possible implementation, the operation that the access network device receives the service request message sent by the terminal device may include the following actions. The access network device receives an RRC connection establishment request message sent by the terminal device, the RRC connection establishment request message carrying the service request message; or the access network device receives an RRC connection establishment complete message sent by the terminal device, the RRC connection establishment complete message carrying the service request message.

In a possible implementation, the service request message may carry a network identifier of the first network.

In a possible implementation, the operation that the access network device sends the indication information to the terminal device may include the following action. The access network device sends system information to the terminal device, the system information carrying the indication information.

In a possible implementation, responsive to the access network device determining that the first network does not support the specific service, the indication information may further be used to indicate the second network to enable the terminal device to initiate the specific service in the second network indicated by the indication information.

In a possible implementation, responsive to the access network device determining that the first network does not support the specific service, the method may further include the following action. The access network device sends an RRC connection release message to the terminal device to enable the terminal device to release an RRC connection with the first network according to the RRC connection release message.

A third aspect provides a terminal device, which may execute operations of a terminal device in the first aspect or any optional implementation of the first aspect. Specifically, the terminal device may include modules and units configured to execute the operations of the terminal device in the first aspect or any possible implementation of the first aspect.

A fourth aspect provides an access network device, which may execute operations of an access network device in the second aspect or any optional implementation of the second aspect. Specifically, the access network device may include modules and units configured to execute the operations of the access network device in the second aspect or any possible implementation of the second aspect.

A fifth aspect provides a terminal device, which includes a processor, a transceiver and a memory. The processor, the transceiver and the memory communicate with each other through an internal connection path. The memory is configured to store instructions, and the processor is configured to execute the instructions stored in the memory. The instructions stored in the memory, when being executed by the processor, enable the terminal device to execute the method in the first aspect or any possible implementation of the first aspect, or enable the terminal device to implement the terminal device provided in the third aspect.

A sixth aspect provides an access network device, which includes a processor, a transceiver and a memory. The processor, the transceiver and the memory communicate with each other through an internal connection path. The memory is configured to store instructions, and the processor is configured to execute the instructions stored in the memory. The instructions stored in the memory, when being executed by the processor, enable the access network device to execute the method in the second aspect or any possible implementation of the second aspect, or enable the access network device to implement the access network device provided in the fourth aspect.

A seventh aspect provides a computer-readable storage medium having stored thereon a program, which enables a terminal device to execute any network fallback method in the first aspect and each implementation thereof.

An eighth aspect provides a computer-readable storage medium having stored thereon a program, which enables an access network device to execute any network fallback method in the second aspect and each implementation thereof.

A ninth aspect provides a system chip, which includes an input interface, an output interface, a processor and a memory. The processor is configured to execute instructions stored in the memory. When the instructions are executed, the processor may implement the method in the first aspect or any possible implementation of the first aspect.

A tenth aspect provides a system chip, which includes an input interface, an output interface, a processor and a memory. The processor is configured to execute instructions stored in the memory. When the instructions are executed, the processor may implement the method in the second aspect or any possible implementation of the second aspect.

An eleventh aspect provides a computer program product including instructions. The computer program product, when being executed on a computer, enables the computer to execute the method in the first aspect or any possible implementation of the first aspect.

A twelfth aspect provides a computer program product including instructions.

The computer program product, when being executed on a computer, enables the computer to execute the method in the second aspect or any possible implementation of the second aspect.

DETAILED DESCRIPTION

The technical solutions in the embodiments of the disclosure will be described below in combination with the drawings.

It is to be understood that the technical solutions of the embodiments of the disclosure may be applied to various communication systems, for example, a Global System of Mobile Communication (GSM), a Code Division Multiple Access (CDMA) system, a Wideband Code Division Multiple Access (WCDMA) system, an LTE system, an LTE Frequency Division Duplex (FDD) system, LTE Time Division Duplex (TDD), a Universal Mobile Telecommunication System (UMTS) and a future 5th-Generation (5G) communication system.

Various embodiments of the disclosure are described in combination with a terminal device. The terminal device may also refer to User Equipment (UE), an access terminal, a user unit, a user station, a mobile radio station, a mobile station, a remote station, a remote terminal, a mobile device, a user terminal, a terminal, a wireless communication device, a user agent, a user device or the like. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle-mounted device, a wearable device, a terminal device in a future 5G network, a terminal device in a future evolved PLMN or the like.

Various embodiments of the disclosure are described in combination with a network device. The network device may be a device used for communicating with the terminal device, for example, may be a Base Transceiver Station (BTS) in the GSM or CDMA, may also be a NodeB (NB) in the WCDMA system and may also be an Evolutional Node B (eNB or eNodeB) in the LTE system. Or the network device may be a relay station, an access point, a vehicle-mounted device, a wearable device, a network-side device in the future 5G network, a network-side device in the future evolved PLMN or the like.

Figure 1:
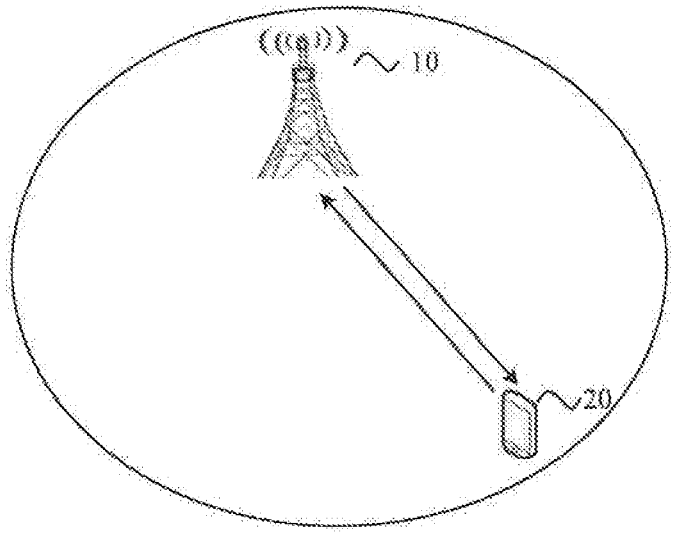
FIG. 1 is a schematic architecture diagram of an application scenario according to an embodiment of the disclosure.

FIG. 1 is a schematic diagram of an application scenario according to an embodiment of the disclosure. A communication system in FIG. 1 may include a network device 10 and a terminal device 20. The network device 10 is configured to provide communication service for the terminal device 20 for access to a core network. The terminal device 20 may search a synchronization signal, broadcast signal and the like sent by the network device 10 to access the network, thereby communicating with the network. Arrows shown in FIG. 1 may represent uplink/downlink transmission implemented through a cellular link between the terminal device 20 and the network device 10.

The network device 10 in FIG. 1 may be, for example, an access network device or a core network device. The access network device may include a primary access network device or a secondary access network device, the primary access network device may be, for example, a macrocell, and the secondary access network may be, for example, a microcell, a picocell and a femtocell, and embodiments of the disclosure are not limited thereto. The core network device may be a Mobility Management Entity (MME) and may also be a Serving Gateway (S-GW) or a Packet Data Network Gateway (P-GW), and embodiments of the disclosure are not limited thereto.

Figure 2:
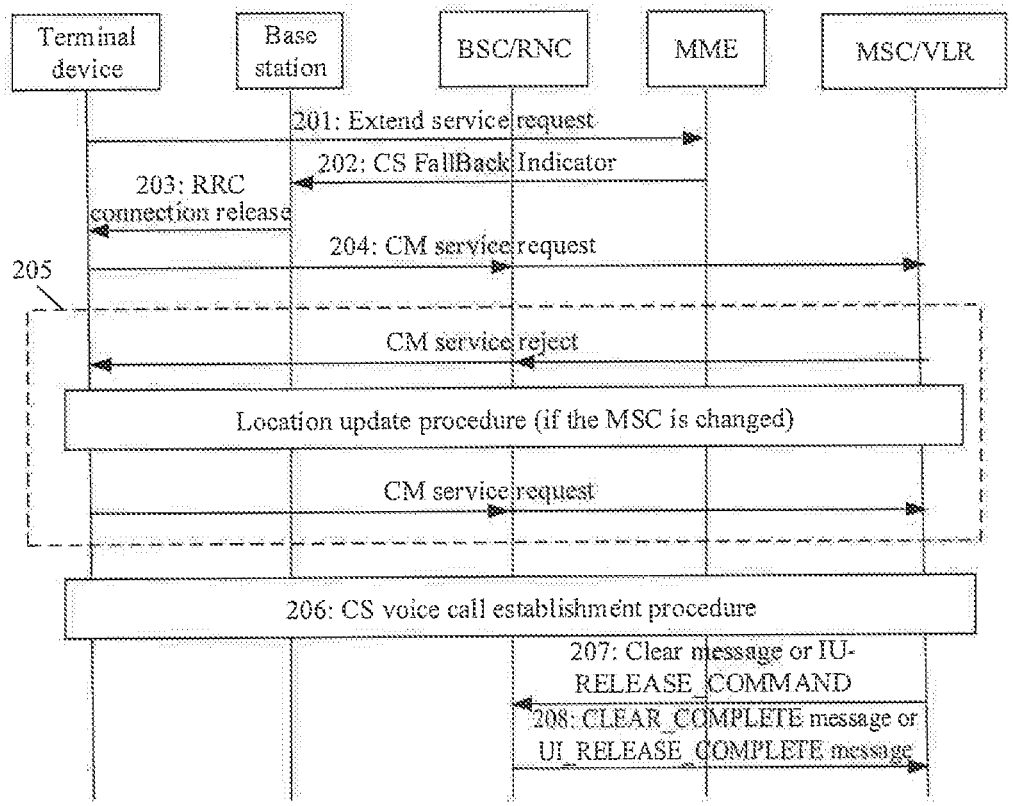
FIG. 2 is an interactive flowchart of an existing network fallback process.

For ease of understanding, a conventional network fallback process in an LTE system will be simply described below in combination with FIG. 2. The network fallback process may be, for example, CSFB. As illustrated in FIG. 2, the CSFB procedure includes part or all of the following operations of 201-208.

In 201, a terminal device, when making a voice call, may send an extend service request message to an MME, and the extend service request message carries CSFB information indicating that the terminal device initiates a CS FallBack voice service request. A cell representing a service type is used for indicating that a type of the service is an originating CSFB voice service. In addition, the extend service request message contains a Temporary Mobile Subscriber Identity (TMSI) allocated to the terminal device by a CS domain in a joint attachment process. Then, the terminal device falls back to a 2nd-Generation (2G) network under assistance of a base station.

In 202, the MME sends an initial context setup request message to the base station, and the initial context setup request message carries a CS fallback indicator message. The CS fallback indicator message is used for notifying the base station that the terminal device is required to fall back to a UMTS Terrestrial Radio Access Network (UTRAN) or a GSM/Enhanced Data Rate for GSM Evolution (EDGE) Radio Access Network (GERAN) due to the CSFB voice service.

In 203, the base station requires the terminal device to perform cell measurement and acquires a measurement result reported by the terminal device to determine a redirected target system cell. Then, the terminal device sends specific radio configuration information for the target system cell and releases an RRC connection with the base station. An LTE network may acquire broadcast information of a 2G target cell in advance through a radio message management flow or a called Radio access network Information Management (RIM) flow, and fills an RRC release message with the broadcast information of a 2G network to transmit to the terminal device, so that time for reading the 2G broadcast information by the terminal device is saved (saved by about 1.83 seconds).

In 204, the terminal device, when accessing the target system cell, is required to initiate a CS domain service request to the target system cell. Here, the terminal device sends a Connect Management (CM) Service Request message to a Mobile Switching Center (MSC) or a Visiting Location Register (VLR) to request for a CS domain service. If the CM service request message carries a calling identifier and a Circuit Switch Mobile Originate (CSMO) identifier, the MSC records the present call as a CSFB call of a CSMO.

In 205, if an MSC server, to which the target system cell belongs, is different from an MSC server registered when the terminal device is attached to an Evolved Packet System (EPS), the MSC server, when receiving a CM service request of the terminal device, may adopt an implicit location update procedure to accept the service request of a user because there is no information about the terminal device. If the MSC server does not support implicit location update and the MSC server has no user data, the CM service request of the terminal device is rejected. If the MSC server rejects the CM service request of the user, the terminal device may initiate a CS domain location update procedure. The terminal device may send a location update request message, and an Additional Update Parameters cell in the location update request message carries the CSMO identifier. If the CSMO identifier is valid, the MSC server may record the present call as a CSFB call.

In 206, after the location update is completed, the terminal device executes a voice call establishment procedure in the CS domain.

In 207, after the call is ended, the MSC server sends a CLEAR COMMAND to a Base Station Control (BSC) that a caller falls back to, and the CLEAR COMMAND message carries a CSFB indication cell for instructing the BSC to clear an air interface connection and instructing the terminal device to return to the LTE network. Or, the MSC server sends an IU_RELEASE_COMMAND to a Radio Network Controller (RNC) that the caller falls back to, and the IU_RELEASE_COMMAND carries an End Of CSFB cell for instructing the RNC to clear the air interface connection and instructing the terminal device to return to the LTE network.

In 208, if the MSC receives a CLEAR COMPLETE message from the BSC or a UI_RELEASE_COMPLETE message from the RNC, it is indicated that the call is ended and clear of A interface connection is completed. An access side, when instructing the terminal device to perform network reselection, implements fast return of the CSFB terminal device to LTE only for an LTE frequency point carried before the call of the CSFB user, which is called a FastReturn process (user-unreachable time may be shortened by 1-2 seconds).

It may be seen that, in the existing CSFB process, when a terminal device wants to execute a voice service, the terminal device may initiate the voice service to a core network, for example, the MME in FIG. 2. If the present network does not support a voice service, the core network may reject the voice service and transmit a CSFB indication to the terminal device to enable the terminal device to fall back to a 2G network, which results in an excessive time in a call process and a call delay is prolonged.

An embodiment of the disclosure provides a network fallback method. When a terminal device cannot initiate a specific service in a present network, an access network device instructs the terminal device to initiate the specific service in another network to enable the terminal device to initiate the specific service in any other network based on an indication from an access network. Therefore, complex signaling interactions between the terminal device and a core network are avoided, and a delay in a network fallback process is reduced.

Figure 3:
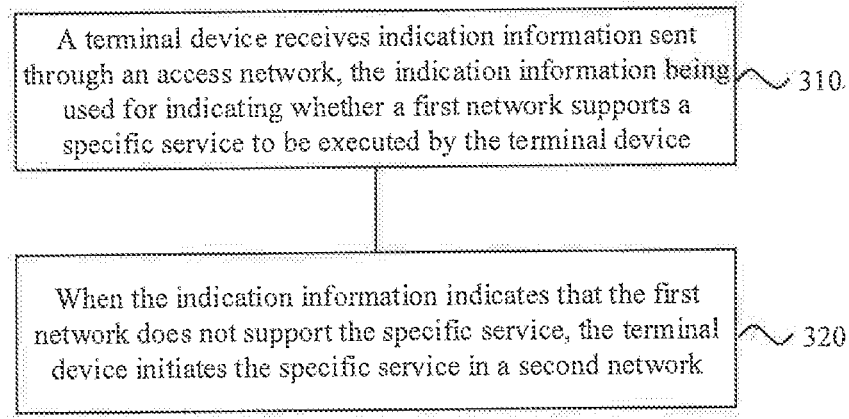
FIG. 3 is a schematic flowchart of a network fallback method according to an embodiment of the disclosure.

FIG. 3 is a schematic flowchart of a network fallback method according to an embodiment of the disclosure. The method illustrated in FIG. 3 may be executed by a terminal device. The terminal device may be, for example, a terminal device 20 illustrated in FIG. 1. As illustrated in FIG. 3, the network fallback method includes the following operations.

In 310, the terminal device receives indication information sent by an access network, and the indication information is used for indicating whether a first network supports a specific service to be executed by the terminal device.

In 320, when the indication information indicates that the first network does not support the specific service, the terminal device initiates the specific service in a second network.

Specifically, if the terminal device initiates a service request to a present network to request for execution of the specific service by the terminal device, the access network may send the indication information to the terminal device, and the indication information is used to indicate whether the first network supports the specific service to be executed by the terminal device. If the indication information indicates that the first network does not support the specific service, for example, the indication information may be a service reject message for rejecting the service request, the terminal device may initiate the specific service in another network, i.e., the second network.

Therefore, when the terminal device cannot initiate a specific service in a present network, the terminal device is able to initiate the specific service in another network based on an indication of the access network, so that complex signaling interactions between the terminal device and a core network are avoided, and a delay in a network fallback process is reduced.

In at least one embodiment, the first network may be, for example, the access network, a core network to which the access network belongs, a PLMN to which the access network belongs or a sliced network carrying the specific service.

In at least one embodiment, the specific service may be a voice service mentioned in FIG. 2 and may also be another service such as a video service.

An access network device may determine information about whether the first network device supports the specific service according to an indication of the core network. Or, the access network device may actively initiate a query to the core network to query about whether the first network supports the specific service, and thus the core network sends the information indicating whether the first network supports the specific service to the access network device according to a query message. Or, a service supported by the first network may be pre-configured in an Operation Management (OM) manner, and the access network device determines whether the first network supports the specific service according to pre-configured information. The access network, after determining whether the first network supports the specific service, indicates the terminal device through the indication information.

In at least one embodiment, before the operation in 310, i.e., before the terminal device receives the indication information sent through the access network, the method may further include that the terminal device sends a service request message to the access network. The service request message is used for requesting for execution of the specific service in the first network.

The operation in 310 that the terminal device receives the indication information sent through the access network may include that the terminal device receives the indication information sent through the access network by the access network device according to the service request message.

Furthermore, in at least one embodiment, the operation that the terminal device sends the service request message to the access network may include the following actions. The terminal device sends an RRC connection establishment request message to the access network, the RRC connection establishment request message carrying the service request message; or the terminal device sends an RRC connection establishment complete message to the access network, the RRC connection establishment complete message carrying the service request message.

Furthermore, in at least one embodiment, the service request message may carry a network identifier of the first network.

For example, the terminal device may communicate with the access network 1, and the access network 1 may simultaneously communicate with a core network 1, a core network 2 and a core network 3. If the terminal device requests for initiating the specific service in the core network 1, the terminal device sends the service request message to the access network 1, and the service request message carries the network identifier of the first network where the service is requested to be initiated, i.e., a network identifier of the core network 1. If the terminal device requests for initiating the specific service in the core network 2, the terminal device sends the service request message to the access network 1, and the service request message carries a network identifier of the core network 2. If the terminal device requests for initiating the specific service in the core network 3, the terminal device sends the service request message to the access network 1, and the service request message carries a network identifier of the core network 3.

In at least one embodiment, the operation in 310 that the terminal device receives the indication information sent through the access network includes that the terminal device receives system information sent through the access network. The system information carries the indication information.

In 320, if the indication information indicates that the first network does not support the specific service, the terminal device is required to determine the second network where the specific service is to be initiated such that the specific service is initiated in the second network. In the embodiment of the disclosure, the terminal device may determine the second network in the following two manners.

A First Manner

In at least one embodiment, if the indication information indicates that the first network does not support the specific service, the indication information is further used to indicate the second network, and the operation that the terminal device initiates the specific service in the second network includes that the terminal device initiates the specific service in the second network indicated by the indication information.

That is, if the access network notifies the terminal device that the first network does not support the specific service, the access network may simultaneously notify the terminal device the second network where the specific service may be initiated, for example, notifying an identifier of the second network to the terminal device, so that the terminal device initiates the specific service in the second network indicated by the access network.

For example, if the access network sends the indication information to the terminal device to indicate that the core network 1 does not support the specific service, the indication information may also carry the network identifier of the core network 2 supporting the specific service, so that the terminal device initiates the specific service in the core network 2.

A Second Manner

In at least one embodiment, the operation that the terminal device initiates the specific service in the second network includes that the terminal device determines the second network in multiple networks and initiates the specific service in the second network.

That is, the access network only notifies the terminal device that the first network does not support the specific service, and the terminal device is required to search another network by itself to initiate the specific service in the second network that is found.

In at least one embodiment, if the indication information indicates that the first network does not support the specific service, before the operation that the terminal device initiates the specific service in the second network, the method further includes the operation that the terminal device receives an RRC connection release message sent through the access network; and the terminal device releases an RRC connection with the first network according to the RRC connection release message.

Specifically, the network fallback method of the embodiment of the disclosure may be applied to a terminal device in an idle state and may also be applied to a terminal device in a connected state. If the terminal device is in the connected state, when the indication information indicates that the first network does not support the specific service, the terminal device is required to release the RRC connection that has been established.

Figure 4:
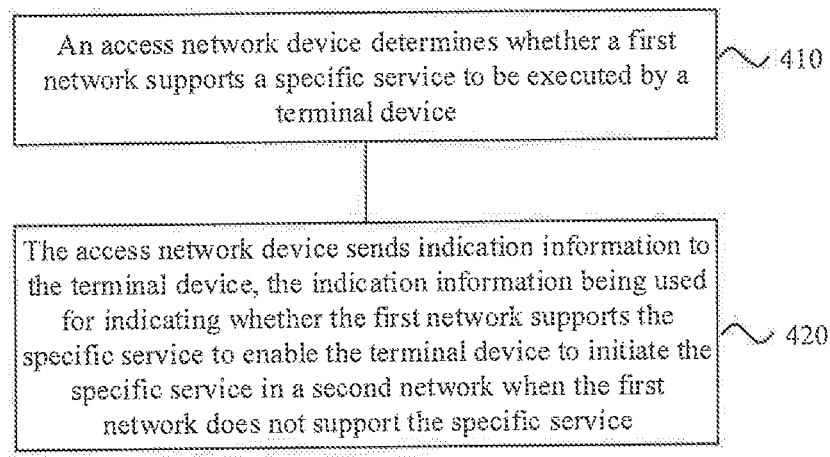
FIG. 4 is a schematic flowchart of a network fallback method according to an embodiment of the disclosure.

FIG. 4 is a schematic flowchart of a network fallback method according to an embodiment of the disclosure. The method illustrated in FIG. 4 may be executed by an access network device. The access network device may be, for example, a network device 10 illustrated in FIG. 1. As illustrated in FIG. 4, the network fallback method includes the following operations.

In 410, the access network device determines whether a first network supports a specific service to be executed by a terminal device.

In 420, the access network device sends indication information to the terminal device the indication information being used for indicating whether the first network supports the specific service, to enable the terminal device to initiate the specific service in a second network when the first network does not support the specific service.

Specifically, if the first network does not support the specific service initiated by the terminal device, the access network device may send the indication information to the terminal device to reject the specific service to be executed by the terminal device. The indication information may be, for example, a service reject message for rejecting a service request, and thus the terminal device may initiate the specific service in another network, i.e., the second network.

Therefore, when the terminal device cannot initiate a specific service in a present network, the access network device instructs the terminal device to initiate the specific service in another network to enable the terminal device to initiate the specific service in the other network based on an indication from an access network. Thus, complex signaling interaction between the terminal device and a core network are avoided, and a delay in a network fallback process is reduced.

In at least one embodiment, the first network includes an access network where the access network device is located, a core network to which the access network belongs, a PLMN to which the access network belongs or a sliced network carrying the specific service.

In at least one embodiment, the specific service includes a voice service or a video service.

In at least one embodiment, the operation that the access network device determines whether the first network supports the specific service to be executed by the terminal device includes the following actions. The access network device receives information indicating whether the first network supports the specific service from the core network; or the access network device sends a query message to the core network and receives the information indicating whether the first network supports the specific service from the core network according to the query message; or the access network device determines whether the first network supports the specific service according to pre-configured information indicating whether the first network supports the specific service.

Specifically, the access network device may determine the information about whether the first network device supports the specific service according to an indication of the core network. Or, the access network device may actively initiate query to the core network to query about whether the first network supports the specific service, and thus the core network sends the information indicating whether the first network supports the specific service to the access network device according to the query message. Or, a service supported by the first network may be pre-configured in an OM manner, and the access network device determines whether the first network supports the specific service according to the pre-configured information.

In at least one embodiment, before the access network device determines whether the first network supports the specific service to be executed by the terminal device, the method further includes that the access network device receives a service request message sent by the terminal device. The service request message is used to request execution of the specific service by the terminal device in the first network.

The operation that the access network device sends the indication information to the terminal device includes that the access network device sends the indication information to the terminal device according to the service request message.

In at least one embodiment, the operation that the access network device receives the service request message sent by the terminal device includes the following actions. The access network device receives an RRC connection establishment request message sent by the terminal device, the RRC connection establishment request message carrying the service request message; or the access network device receives an RRC connection establishment complete message sent by the terminal device, the RRC connection establishment complete message carrying the service request message.

In at least one embodiment, the service request message carries a network identifier of the first network.

In at least one embodiment, the operation that the access network device sends the indication information to the terminal device includes that the access network device sends system information to the terminal device. The system information carries the indication information.

In at least one embodiment, if the access network device determines that the first network does not support the specific service, the indication information is further used to indicate the second network to enable the terminal device to initiate the specific service in the second network indicated by the indication information.

In at least one embodiment, if the access network device determines that the first network does not support the specific service, the method further includes that the access network device sends an RRC connection release message to the terminal device to enable the terminal device to release an RRC connection with the first network according to the RRC connection release message.

It is to be understood that specific details about the access network device in the network fallback process may refer to related descriptions about the terminal device in FIG. 3 and, will not elaborated herein for simplicity.

It is also to be understood that, in various embodiments of the disclosure, a magnitude of a sequence number of each process does not mean an execution sequence, the execution sequence of each process should be determined by its function and an internal logic and should not form any limit to an implementation process of the embodiments of the disclosure.

Figure 5:
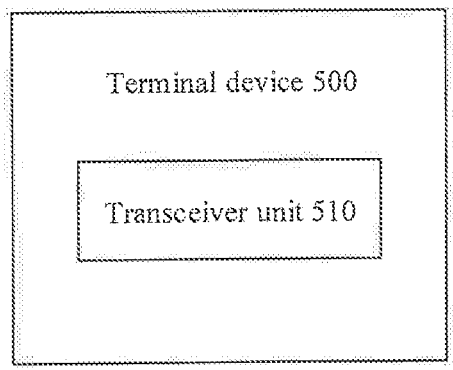
FIG. 5 is a schematic block diagram of a terminal device according to an embodiment of the disclosure.

FIG. 5 is a schematic block diagram of a terminal device 500 according to an embodiment of the disclosure. As illustrated in FIG. 5, the terminal device 500 includes a transceiver unit 510.

The transceiver unit 510 is configured to receive indication information sent by an access network, the indication information being used to indicate whether a first network supports a specific service to be executed by the terminal device; and if the indication information indicates that the first network does not support the specific service, initiate the specific service in a second network.

Therefore, when the terminal device cannot initiate a specific service in a present network, the specific service can be initiated in another network based on an indication of the access network, and thus complex signaling interaction between the terminal device and a core network are avoided, and a delay in a network fallback process is reduced.

In at least one embodiment, the first network includes the access network, a core network to which the access network belongs, a PLMN to which the access network belongs or a sliced network carrying the specific service.

In at least one embodiment, the specific service includes a voice service or a video service.

In at least one embodiment, the transceiver unit 510 is further configured to send a service request message to the access network, the service request message being used to request for execution of the specific service in the first network; and receive the indication information sent through the access network according to the service request message.

In at least one embodiment, the transceiver unit 510 is specifically configured to send an RRC connection establishment request message to the access network, the RRC connection establishment request message carrying the service request message, or send an RRC connection establishment complete message to the access network, the RRC connection establishment complete message carrying the service request message.

In at least one embodiment, the service request message carries a network identifier of the first network.

In at least one embodiment, the transceiver unit 510 is specifically configured to receive system information sent through the access network, the system information carrying the indication information.

In at least one embodiment, if the indication information indicates that the first network does not support the specific service, the indication information is further used to indicate the second network, and the transceiver unit 510 is specifically configured to initiate the specific service in the second network indicated by the indication information.

In at least one embodiment, the transceiver unit 510 is specifically configured to determine the second network in multiple networks and initiate the specific service in the second network.

In at least one embodiment, the transceiver unit 510 is further configured to receive an RRC connection release message sent through the access network and release an RRC connection with the first network according to the RRC connection release message.

Figure 6:
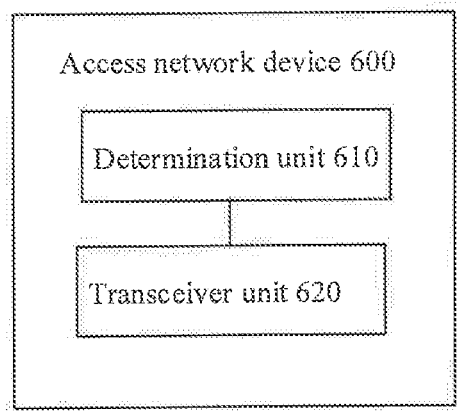
FIG. 6 is a schematic block diagram of an access network device according to an embodiment of the disclosure.

FIG. 6 is a schematic block diagram of an access network device 600 according to an embodiment of the disclosure. As illustrated in FIG. 6, the access network device 600 includes a determination unit 610 and a transceiver unit 620.

The determination unit 610 is configured to determine whether a first network supports a specific service to be executed by a terminal device or not.

The transceiver unit 620 is configured to send indication information to the terminal device. The indication information is used to indicate whether the first network supports the specific service, to enable the terminal device to initiate the specific service in a second network when the first network does not support the specific service.

Therefore, when the terminal device cannot initiate a specific service in a present network, the access network device instructs the terminal device to initiate the specific service in another network to enable the terminal device to initiate the specific service in the other network based on an indication of an access network. Thus, complex signaling interaction between the terminal device and a core network are avoided, and a delay in a network fallback process is reduced.

In at least one embodiment, the first network includes an access network where the access network device is located, a core network to which the access network belongs to, a PLMN to which the access network belongs or a sliced network carrying the specific service.

In at least one embodiment, the specific service includes a voice service or a video service.

In at least one embodiment, the determination unit 610 is specifically configured to receive, through the transceiver unit 620, information indicating whether the first network supports the specific service from the core network; or send through the transceiver unit 620, a query message to the core network and receive the information indicating whether the first network supports the specific service from the core network according to the query message; or determine whether the first network supports the specific service according to pre-configured information indicating whether the first network supports the specific service.

In at least one embodiment, the transceiver unit 620 is further configured to receive a service request message sent by the terminal device, the service request message being used to request for execution of the specific service in the first network; and send the indication information to the terminal device according to the service request message.

In at least one embodiment, the transceiver unit 620 is specifically configured to receive an RRC connection establishment request message sent by the terminal device, the RRC connection establishment request message carrying the service request message, or receive an RRC connection establishment complete message sent by the terminal device, the RRC connection establishment complete message carrying the service request message.

In at least one embodiment, the service request message carries a network identifier of the first network.

In at least one embodiment, the transceiver unit 620 is specifically configured to send system information to the terminal device, the system information carrying the indication information.

In at least one embodiment, when the access network device determines that the first network does not support the specific service, the indication information is further configured to indicate the second network to enable the terminal device to initiate the specific service in the second network indicated by the indication information.

In at least one embodiment, the transceiver unit 620 is further configured to send an RRC connection release message to the terminal device to enable the terminal device to release an RRC connection with the first network according to the RRC connection release message.

Figure 7:
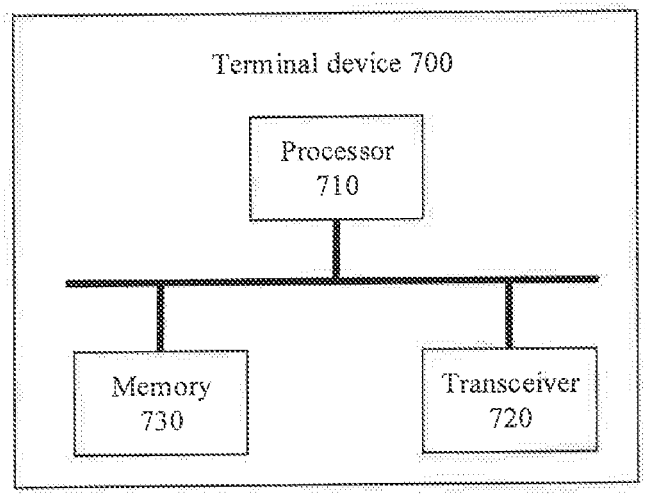
FIG. 7 is a schematic structure diagram of a terminal device according to an embodiment of the disclosure.

FIG. 7 is a schematic structure diagram of a terminal device 700 according to an embodiment of the disclosure. As illustrated in FIG. 7, the terminal device includes a processor 710, a transceiver 720 and a memory 730. The processor 710, the transceiver 720 and the memory 730 communicate with each other through an internal connection path. The memory 730 is configured to store instructions, and the processor 710 is configured to execute the instructions stored in the memory 730 to control the transceiver 720 to receive or send a signal.

The transceiver 720 is configured to: receive indication information sent by an access network, the indication information being used to indicate whether a first network supports a specific service to be executed by the terminal device; and when the indication information indicates that the first network does not support the specific service, initiate the specific service in a second network.

Therefore, when the terminal device cannot initiate a specific service in a present network, the specific service may be initiated in another network based on an indication of the access network, and thus complex signaling interactions between the terminal device and a core network are avoided, and a delay in a network fallback process is reduced.

In at least one embodiment, the first network includes the access network, a core network to which the access network belongs, a PLMN to which the access network belongs or a sliced network carrying the specific service.

In at least one embodiment, the specific service includes a voice service or a video service.

In at least one embodiment, the transceiver 720 is further configured to send a service request message to the access network, the service request message being used to request for execution of the specific service in the first network; and receive the indication information sent through the access network according to the service request message.

In at least one embodiment, the transceiver 720 is specifically configured to send an RRC connection establishment request message to the access network, the RRC connection establishment request message carrying the service request message, or send an RRC connection establishment complete message to the access network, the RRC connection establishment complete message carrying the service request message.

In at least one embodiment, the service request message carries a network identifier of the first network.

In at least one embodiment, the transceiver 720 is specifically configured to receive system information sent through the access network, the system information carrying the indication information.

In at least one embodiment, if the indication information indicates that the first network does not support the specific service, the indication information is further configured to indicate the second network, and the transceiver 720 is specifically configured to initiate the specific service in the second network indicated by the indication information.

In at least one embodiment, the transceiver 720 is specifically configured to determine the second network in multiple networks and initiate the specific service in the second network.

In at least one embodiment, the transceiver 720 is further configured to receive an RRC connection release message sent through the access network and release an RRC connection of the terminal device with the first network according to the RRC connection release message.

It is to be understood that, in the embodiment of the disclosure, the processor 710 may be a Central Processing Unit (CPU), and the processor 710 may also be another universal processor, a Digital Signal Processor (DSP), an Application Specific Integrated Circuit (ASIC), a Field Programmable Gate Array (FPGA) or another programmable logic device, discrete gate or transistor logic device and discrete hardware component and the like. The universal processor may be a microprocessor or the processor may also be any conventional processor and the like.

The memory 730 may include a Read-Only Memory (ROM) and a Random Access Memory (RAM), and provide instructions and data to the processor 710. A part of the memory 730 may further include a non-transitory RAM.

In an implementation process, each operation of the method may be completed by an integrated logic circuit of hardware in the processor 710 or an instruction in a software form. The operations of a positioning method disclosed in combination with the embodiments of the disclosure may be directly embodied to be executed and completed by a hardware processor or executed and completed by a combination of hardware and software modules in the processor 710. The software module may be located in a mature storage medium in this field such as a RAM, a flash memory, a ROM, a programmable ROM or electrically erasable programmable ROM and a register. The storage medium is located in the memory 730. The processor 710 reads information in the memory 730 and completes the operations of the method implemented in combination with hardware. To avoid repetitions, detailed descriptions will not be elaborated herein.

The terminal device 700 according to the embodiment of the disclosure may correspond to the terminal device configured to execute the method 300 in the method 300 and the terminal device 500 according to the embodiment of the disclosure. Each unit or module in the terminal device 700 is configured to execute each operation or processing process executed by the terminal device in the method 300. Herein, detailed descriptions thereof are omitted to avoid redundancy.

Figure 8:
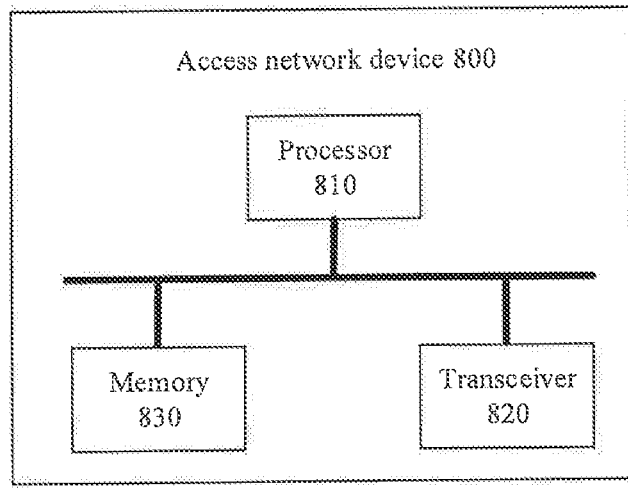
FIG. 8 is a schematic structure diagram of an access network device according to an embodiment of the disclosure.

FIG. 8 is a schematic structure diagram of an access network device 800 according to an embodiment of the disclosure. As illustrated in FIG. 8, the access network device includes a processor 810, a transceiver 820 and a memory 830. Herein, the processor 810, the transceiver 820 and the memory 830 communicate with each other through an internal connection path. The memory 830 is configured to store instructions, and the processor 810 is configured to execute the instructions stored in the memory 830 to control the transceiver 820 to receive or send a signal.

The processor 810 is configured to determine whether a first network supports a specific service to be executed by a terminal device.

The transceiver 820 is configured to send indication information to the terminal device, the indication information being used for indicating whether the first network supports the specific service, to enable the terminal device to initiate the specific service in a second network when the first network does not support the specific service.

Therefore, in condition that the terminal device cannot initiate a specific service in a present network, the access network device instructs the terminal device to initiate the specific service in another network to enable the terminal device to initiate the specific service in the other network based on an indication of an access network. In this way, complex signaling interactions between the terminal device and a core network are avoided, and a delay in a network fallback process is reduced.

In at least one embodiment, the first network includes an access network where the access network device is located, a core network to which the access network belongs, a PLMN to which the access network belongs or a sliced network carrying the specific service.

In at least one embodiment, the specific service includes a voice service or a video service.

In at least one embodiment, the processor 810 is specifically configured to: receive, through the transceiver 820, information indicating whether the first network supports the specific service from the core network; or send, through the transceiver 820, a query message to the core network and receive the information indicating whether the first network supports the specific service from the core network according to the query message; or determine whether the first network supports the specific service according to pre-configured information indicating whether the first network supports the specific service.

In at least one embodiment, the transceiver 820 is further configured to receive a service request message sent by the terminal device, the service request message being used to request for execution of the specific service in the first network; and send the indication information to the terminal device according to the service request message.

In at least one embodiment, the transceiver 820 is specifically configured to receive an RRC connection establishment request message sent by the terminal device, the RRC connection establishment request message carrying the service request message; or receive an RRC connection establishment complete message sent by the terminal device, the RRC connection establishment complete message carrying the service request message.

In at least one embodiment, the service request message carries a network identifier of the first network.

In at least one embodiment, the transceiver 820 is specifically configured to send system information to the terminal device, the system information carrying the indication information.

In at least one embodiment, when the access network device determines that the first network does not support the specific service, the indication information is further used to indicate the second network to enable the terminal device to initiate the specific service in the second network indicated by the indication information.

In at least one embodiment, the transceiver 820 is further configured to send an RRC connection release message to the terminal device to enable the terminal device to release an RRC connection with the first network according to the RRC connection release message.

It is to be understood that, in the embodiment of the disclosure, the processor 810 may be a CPU and the processor 810 may also be another universal processor, a DSP, an ASIC, an FPGA or another programmable logic device, discrete gate or transistor logic device and discrete hardware component and the like. The universal processor may be a microprocessor or the processor may also be any conventional processor and the like.

The memory 830 may include a ROM and a RAM and provides an instruction and data for the processor 810. A part of the memory 830 may further include a nonvolatile RAM. In an implementation process, each step of the method may be completed by an integrated logic circuit of hardware in the processor 810 or an instruction in a software form. The operations of a positioning method disclosed in combination with the embodiments of the application may be directly embodied to be executed and completed by a hardware processor or executed and completed by a combination of hardware and software modules in the processor 810. The software module may be located in a mature storage medium in this field such as a RAM, a flash memory, a ROM, a programmable ROM or electrically erasable programmable ROM and a register. The storage medium is located in the memory 830. The processor 810 reads information in the memory 830 and completes the steps of the method in combination with hardware. No more detailed descriptions will be made herein to avoid repetitions.

The access network device 800 according to the embodiment of the disclosure may correspond to the access network device configured to execute the method 400 in the method 400 and the access network device 600 according to the embodiment of the disclosure. Each unit or module in the access network device 800 is configured to execute each operation or processing process executed by the terminal device in the method 400. Herein, detailed descriptions thereof are omitted to avoid redundancy.

Figure 9:
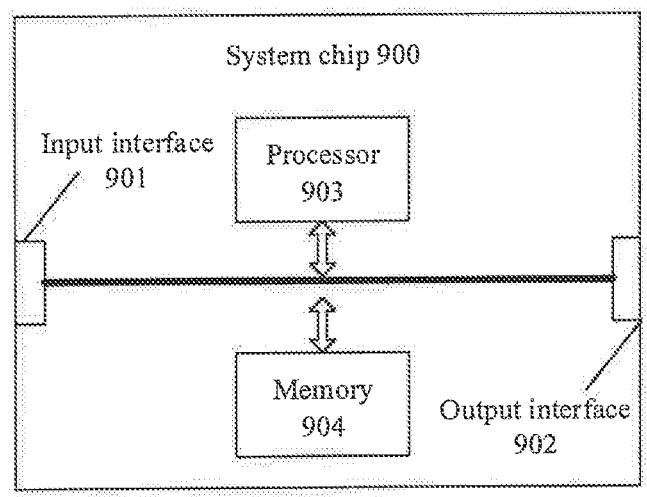
FIG. 9 is a schematic structure diagram of a system chip according to an embodiment of the disclosure.

FIG. 9 is a schematic structure diagram of a system chip according to an embodiment of the disclosure. The system chip 900 of FIG. 9 includes an input interface 901, an output interface 902, at least one processor 903 and a memory 904. The input interface 901, the output interface 902, the processor 903 and the memory 904 are connected with each other through an internal connection path. The processor 903 is configured to execute a code in the memory 904.

In at least one embodiment, when the code is executed, the processor 903 may implement the method 300 executed by a terminal device in the method embodiments, which will not elaborated herein for simplicity.

In at least one embodiment, when the code is executed, the processor 903 may implement the method 400 executed by an access network device in the method embodiments, which will not elaborated herein for simplicity.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Those skilled in the art can use different methods to implement the described functions for each specific application, but such implementations should not be regarded as a departure from the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a monitoring unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, an access network device or the like) to execute all or part of the steps of the method in each embodiment of the disclosure. The storage medium includes: various media capable of storing program codes such as a U disk, a mobile hard disk, a ROM, a RAM, a magnetic disk or an optical disk.

The above is only the specific implementation of the disclosure and not intended to limit the scope of protection of the embodiments of the disclosure. Any variations or replacements apparent to those skilled in the art within the technical scope disclosed by the embodiments of the disclosure shall fall within the scope of protection of the disclosure. Therefore, the scope of protection of the embodiments of the disclosure shall be subject to the protection scope of the claims.

The invention claimed is:

1. A network fallback method, comprising:
 receiving, by a terminal device, indication information sent through an access network, the indication information being used for indicating whether a first network supports a specific service to be executed by the terminal device, wherein services supported by the first network are pre-configured in an operation management manner, and whether the first network supports the specific service is determined by the access network device according to pre-configured information indicating the services supported by the first network; and
 when the indication information indicates that the first network does not support the specific service, initiating, by the terminal device, the specific service in a second network.

2. The method of claim 1, wherein the first network comprises the access network, a core network to which the access network belongs, a Public Land Mobile Network (PLMN) to which the access network belongs or a sliced network carrying the specific service, and the specific service comprises a voice service or a video service.

3. The method of claim 1, wherein before receiving, by the terminal device, the indication information sent through the access network, the method further comprises:
sending, by the terminal device, a service request message to the access network, the service request message being used for requesting for execution of the specific service in the first network,
wherein receiving, by the terminal device, the indication information sent through the access network comprises:
receiving, by the terminal device, the indication information sent through the access network according to the service request message.

4. The method of claim 3, wherein sending, by the terminal device, the service request message to the access network comprises:
sending, by the terminal device, a Radio Resource Control (RRC) connection establishment request message to the access network, the RRC connection establishment request message carrying the service request message; or
sending, by the terminal device, an RRC connection establishment complete message to the access network, the RRC connection establishment complete message carrying the service request message.

5. The method of claim 3, wherein the service request message carries a network identifier of the first network.

6. The method of claim 1, wherein initiating, by the terminal device, the specific service in the second network comprises:
determining, by the terminal device, the second network in multiple networks and initiating the specific service in the second network.

7. The method of claim 1, wherein when the indication information indicates that the first network does not support the specific service, before initiating, by the terminal device, the specific service in the second network, the method further comprises:
receiving, by the terminal device, an RRC connection release message sent through the access network; and
releasing, by the terminal device, an RRC connection with the first network according to the RRC connection release message.

8. A terminal device, comprising:
a transceiver, configured to receive indication information sent through an access network, the indication information being used for indicating whether a first network supports a specific service to be executed by the terminal device, wherein services supported by the first network are pre-configured in an operation management manner, and whether the first network supports the specific service is determined by the access network device according to pre-configured information indicating the services supported by the first network; and
when the indication information indicates that the first network does not support the specific service, initiate the specific service in a second network.

9. The terminal device of claim 8, wherein the first network comprises the access network, a core network to which the access network belongs, a Public Land Mobile Network (PLMN) to which the access network belongs or a sliced network carrying the specific service, and the specific service comprises a voice service or a video service.

10. The terminal device of claim 8, wherein the transceiver is further configured to:
send a service request message to the access network, the service request message being used for requesting for execution of the specific service in the first network; and
receive the indication information sent through the access network according to the service request message.

11. The terminal device of claim 10, wherein the transceiver is configured to:
send a Radio Resource Control (RRC) connection establishment request message to the access network, the RRC connection establishment request message carrying the service request message; or
send an RRC connection establishment complete message to the access network, the RRC connection establishment complete message carrying the service request message.

12. The terminal device of claim 10, wherein the service request message carries a network identifier of the first network.

13. The terminal device of claim 8, wherein, when the indication information indicates that the first network does not support the specific service, the indication information is further used for indicate the second network; and
the transceiver is configured to:
initiate the specific service in the second network indicated by the indication information.

14. The terminal device of claim 8, wherein the transceiver is configured to:
determine the second network in multiple networks and initiate the specific service in the second network.

15. The terminal device of claim 8, wherein the transceiver is further configured to:
receive an RRC connection release message sent through the access network; and
release an RRC connection with the first network according to the RRC connection release message.

16. An access network device, comprising:
a processor, configured to determine whether a first network supports a specific service to be executed by a terminal device; and
a transceiver, configured to send indication information to the terminal device, to enable the terminal device to initiate the specific service in a second network in condition that the first network does not support the specific service, the indication information being used for indicating whether the first network supports the specific service,
wherein services supported by the first network are pre-configured in an operation management manner, and the processor is configured to determine whether the first network supports the specific service according to pre-configured information indicating the services supported by the first network.

17. The access network device of claim 16, wherein the transceiver is further configured to:
receive a service request message sent by the terminal device, the service request message being used for requesting for execution of the specific service in the first network; and
send the indication information to the terminal device according to the service request message.

18. The access network device of claim 17, wherein the transceiver is configured to:

receive a Radio Resource Control (RRC) connection establishment request message sent by the terminal device, the RRC connection establishment request message carrying the service request message; or receive an RRC connection establishment complete message sent by the terminal device, the RRC connection establishment complete message carrying the service request message.

19. The access network device of claim 16, wherein the transceiver is further configured to:

send an RRC connection release message to the terminal device to enable the terminal device to release an RRC connection with the first network according to the RRC connection release message.

\* \* \* \* \*